US011285420B2

(12) United States Patent
Lees et al.

(10) Patent No.: US 11,285,420 B2
(45) Date of Patent: Mar. 29, 2022

(54) OIL COALESCING VENT ASSEMBLY

(71) Applicant: DONALDSON COMPANY, INC., Minneapolis, MN (US)

(72) Inventors: Shannon Lees, St. Louis Park, MN (US); Daniel Dotzler, Webster, MN (US); Michael J. Hebert, St. Paul, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 157 days.

(21) Appl. No.: 16/611,760

(22) PCT Filed: May 8, 2018

(86) PCT No.: PCT/US2018/031651
§ 371 (c)(1),
(2) Date: Nov. 7, 2019

(87) PCT Pub. No.: WO2018/208819
PCT Pub. Date: Nov. 15, 2018

(65) Prior Publication Data
US 2020/0061506 A1    Feb. 27, 2020

Related U.S. Application Data

(60) Provisional application No. 62/503,180, filed on May 8, 2017.

(51) Int. Cl.
*B01D 46/00*  (2006.01)
*B01D 46/54*  (2006.01)
(Continued)

(52) U.S. Cl.
CPC ....... *B01D 46/003* (2013.01); *B01D 46/0001* (2013.01); *B01D 46/543* (2013.01);
(Continued)

(58) Field of Classification Search
CPC .......... B01D 46/0001; B01D 46/003; B01D 46/543; B01D 63/087; B01D 2279/35; B60B 7/002
See application file for complete search history.

(56) References Cited

U.S. PATENT DOCUMENTS

| 3,064,982 A | 11/1962 | Stephens |
| 5,752,746 A | 5/1998 | Perry |

(Continued)

FOREIGN PATENT DOCUMENTS

| CN | 107206300 | 9/2017 |
| CN | 107405545 | 11/2017 |

(Continued)

OTHER PUBLICATIONS

International Patent Application No. PCT/US2018/031651, filed May 8, 2018, International Preliminary Report on Patentability dated Nov. 12, 2019, 7 pages.

(Continued)

*Primary Examiner* — Jonathan Miller
*Assistant Examiner* — Gabriel E Gitman
(74) *Attorney, Agent, or Firm* — Mueting Raasch Group

(57) ABSTRACT

A vent assembly (100) has a vent body (110) defining a first end (104) and a second end (106), a central axis extending from the first end to the second end, and an inner surface defining a cavity. A first retainer extends across the cavity towards the first end of the vent body, and a second retainer (140) extends across the cavity towards the second end of the vent body. The first retainer defines a first retainer opening extending to a first radial distance from the central axis, and the second retainer defines a second retainer opening extending to a second radial distance from the central axis, where the second radial distance is greater than the first radial distance. Coalescing filter media is disposed (Continued)

in the cavity between the first retainer and the second retainer. The coalescing filter media, the cavity, the first retainer, and the second retainer cumulatively define an airflow pathway.

26 Claims, 9 Drawing Sheets

(51) Int. Cl.
  *B60B 7/00* (2006.01)
  *B01D 63/08* (2006.01)
(52) U.S. Cl.
  CPC ............ *B60B 7/002* (2013.01); *B01D 63/087* (2013.01); *B01D 2279/35* (2013.01)

(56) References Cited

U.S. PATENT DOCUMENTS

| | | | |
|---|---|---|---|
| 5,785,390 A * | 7/1998 | Gold | B60B 7/00 |
| | | | 301/108.1 |
| 5,860,708 A | 1/1999 | Borders et al. | |
| 6,139,595 A | 10/2000 | Herman et al. | |
| 6,325,463 B1 | 12/2001 | Sitter et al. | |
| 6,640,792 B2 | 11/2003 | Harvey et al. | |
| 6,938,963 B2 * | 9/2005 | Denton | B60B 7/002 |
| | | | 301/108.1 |
| 7,052,532 B1 * | 5/2006 | Liu | F01N 3/0224 |
| | | | 96/154 |
| 7,156,890 B1 * | 1/2007 | Thompson | B01D 46/0005 |
| | | | 301/108.1 |
| 7,314,497 B2 | 1/2008 | Kahlbaugh et al. | |
| 7,704,300 B2 | 4/2010 | Szepessy | |
| 8,974,567 B2 | 3/2015 | Verdegan et al. | |
| 2004/0160115 A1 * | 8/2004 | Allsop | B60B 27/02 |
| | | | 301/108.1 |
| 2005/0235614 A1 * | 10/2005 | Smith | B01D 46/003 |
| | | | 55/309 |
| 2010/0031940 A1 | 2/2010 | Mosset et al. | |
| 2011/0041695 A1 | 2/2011 | Guerry et al. | |
| 2011/0048228 A1 * | 3/2011 | Handley | B01D 46/125 |
| | | | 95/45 |
| 2012/0234748 A1 | 9/2012 | Little et al. | |
| 2012/0292252 A1 * | 11/2012 | Chase | B01D 46/003 |
| | | | 210/634 |
| 2014/0361605 A1 | 12/2014 | Feicha et al. | |
| 2016/0166952 A1 | 6/2016 | Hahn et al. | |
| 2017/0028330 A1 | 2/2017 | Dawar et al. | |

FOREIGN PATENT DOCUMENTS

| | | | | |
|---|---|---|---|---|
| CN | 109999573 | | 7/2019 | |
| DE | 102007043462 | | 2/2009 | |
| DE | 102015005226 | | 10/2016 | |
| EP | 2730324 | | 5/2014 | |
| FR | 2697443 | | 5/1994 | |
| FR | 2997634 | | 11/2014 | |
| WO | 2007/123815 | | 11/2007 | |
| WO | 2014/209884 | | 12/2014 | |
| WO | 2016/099582 | | 6/2016 | |
| WO | 2016/123354 | | 8/2016 | |
| WO | WO2016123354 A1 * | 8/2016 | ......... B01D 39/1623 |
| WO | 2016/159951 | | 10/2016 | |

OTHER PUBLICATIONS

International Patent Application No. PCT/US2018/031651, filed May 8, 2018, International Search Report and Written Opinion dated Sep. 25, 2018, 11 pages.

* cited by examiner

SECTION A-A

OIL COALESCING VENT ASSEMBLY

This application is the § 371 U.S. National Stage of International Application No. PCT/US2018/031651, filed May 8, 2018, in the name of Donaldson Company, Inc., a U.S. national corporation, applicant for the designation of all countries, and Shannon Lees, a U.S. Citizen; Daniel Dotzler, a U.S. Citizen; and Michael J. Hebert, a U.S. Citizen; inventors for the designation of all countries, and claims priority to U.S. Provisional Application No. 62/503,180, filed May 8, 2017, the contents of which are herein incorporated by reference in their entireties.

FIELD OF THE TECHNOLOGY

The technology disclosed herein generally relates to a vent assembly. More particularly, the technology disclosed herein relates to an oil coalescing vent assembly.

BACKGROUND

Various types of housings, such as hub caps and other oil-filled hubs generally require some sort of breather vent that allows the pressure between the hub and the external environment to equalize. Such hubs can be incorporated in various vehicles such as off-road vehicles, semi-trucks and trailers, as examples. Some breather vents incorporate filter media to prevent the ingress of contaminants such as dust and fluids to the hub. Oil present in the hub, however, can splash and make contact with the filter media, which can limit the lifespan of the vent when the filter media becomes blocked with oil.

SUMMARY

A vent assembly has a vent body defining a first end and a second end, a central axis extending from the first end to the second end, and an inner surface defining a cavity. A first retainer extends across the cavity towards the first end of the vent body, and a second retainer extends across the cavity towards the second end of the vent body. The first retainer defines a first retainer opening extending to a first radial distance from the central axis, and the second retainer defines a second retainer opening extending to a second radial distance from the central axis, where the second radial distance is greater than the first radial distance. Coalescing filter media is disposed in the cavity between the first retainer and the second retainer. The coalescing filter media, the cavity, the first retainer, and the second retainer cumulatively define an airflow pathway.

In some embodiments, the vent body has an insertion portion defining the second end of the vent body. In some such embodiments, the vent body defines a retaining rim that extends radially outward from the insertion portion. Additionally or alternatively, the vent body has an endcap portion on the first end that extends over the cavity. In some embodiments the endcap portion defines radial openings in gaseous communication with the first retainer opening. Additionally or alternatively, the endcap portion and the vent body form a cohesive, unitary component.

Additionally or alternatively, the inner surface of the vent body comprises an inner cylindrical surface. Additionally or alternatively, the second retainer and the vent body are a cohesive, unitary component. Additionally or alternatively, the second retainer forms a frictional fit with the vent body. Additionally or alternatively, the first retainer forms a frictional fit with the vent body. Additionally or alternatively, the vent assembly has a membrane where the membrane is disposed across the airflow pathway between the coalescing filter media and the first retainer. Alternatively, the first retainer is disposed across the cavity between the coalescing filter media and the membrane.

Additionally or alternatively, the second retainer opening is in gaseous and liquid communication with the coalescing media. Additionally or alternatively, the first retainer opening is in gaseous communication with the coalescing filter media and the first retainer opening is not in liquid communication with the coalescing filter media. Additionally or alternatively, the first retainer opening is in gaseous and liquid communication with the coalescing filter media. Additionally or alternatively, the coalescing filter media comprises a plurality of layers of sheets of coalescing filter media. Additionally or alternatively, the coalescing filter media comprises at least one sheet of coalescing filter media in a spiral configuration. Additionally or alternatively, a spacing region is defined between the membrane and the coalescing filter media. Additionally or alternatively, the vent assembly is configured to be inserted in a hub cap window.

Some embodiments disclosed herein relate to a method of making a vent assembly. A vent body is molded to have an insertion portion at a first end, an inner surface defining a cavity, and an endcap portion at a second end to form a cohesive, unitary component. The vent body defines a central axis extending from the first end to the second end, and the endcap portion defines radial openings in fluid communication with the cavity. A first retainer is inserted into the cavity of the vent body to form a frictional fit with the inner surface. A membrane is inserted into the cavity of the vent body towards the first end of the vent body. Coalescing filter media is inserted into the cavity of the vent body after inserting the first retainer and membrane. A second retainer is inserted into the second end of the cavity to form a frictional fit with the inner surface, where inserting the second retainer is after inserting the coalescing filter media.

In some such embodiments, the unitary, cohesive vent body defines a retaining rim that extends radially outward from the insertion portion. Additionally or alternatively, the coalescing filter media comprises a plurality of layers of sheets of coalescing filter media. Additionally or alternatively, the insertion portion of the vent body is inserted into an opening defined by a hubcap window. Additionally or alternatively, the membrane is coupled to the inner surface of the vent body at the first end of the cavity and the first retainer is inserted after inserting the membrane. Alternatively, the membrane is coupled to the first retainer such that inserting the membrane and inserting the first retainer is simultaneous. Other embodiments are also described.

BRIEF DESCRIPTION OF THE DRAWINGS

The current technology may be more completely understood and appreciated in consideration of the following detailed description of various embodiments of the current technology in connection with the accompanying drawings.

DETAILED DESCRIPTION

Vent assemblies consistent with the current technology are generally configured to couple to an opening in a housing containing an oil to allow pressure to equalize between the inside of the housing and the environment outside of the housing. The vent assemblies generally incorporate filter media that prevents the ingress of contaminants such as dust and fluids to the housing. For example, a microporous membrane can be a filter media incorporated in the vent assembly that is configured to prevent the ingress of liquids to the housing. As another example, oil coalescing media can be another filter media incorporated in the vent assembly that is configured to coalesce oil that makes contact. The vent assembly can define a fluid pathway to direct fluid from the coalescing media out of the vent assembly when the vent assembly is subjected to centrifugal force. In various implementations, the housing and the vent assembly are configured to rotate, which generates inertial forces resulting in a centrifugal effect that can eject the oil in the coalescing media out of the vent assembly via the fluid pathway. FIGS. 1-6

Figure 1:
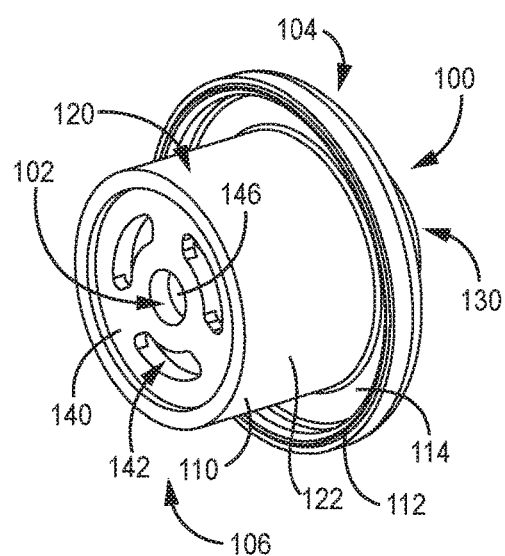
FIG. 1 is a first perspective view of an example vent assembly consistent with the technology disclosed herein.
Figure 2:
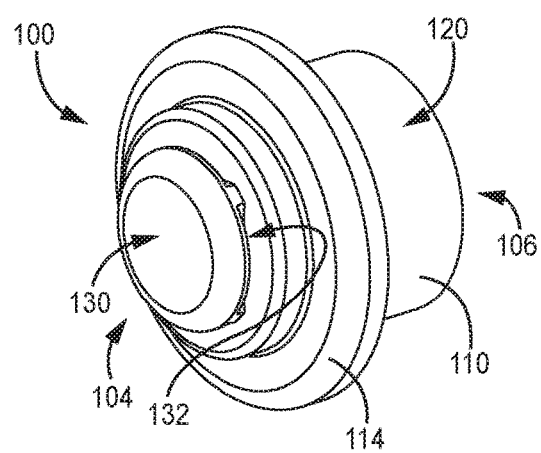
FIG. 2 is second perspective view of the example vent assembly of FIG. 1.
Figure 3:
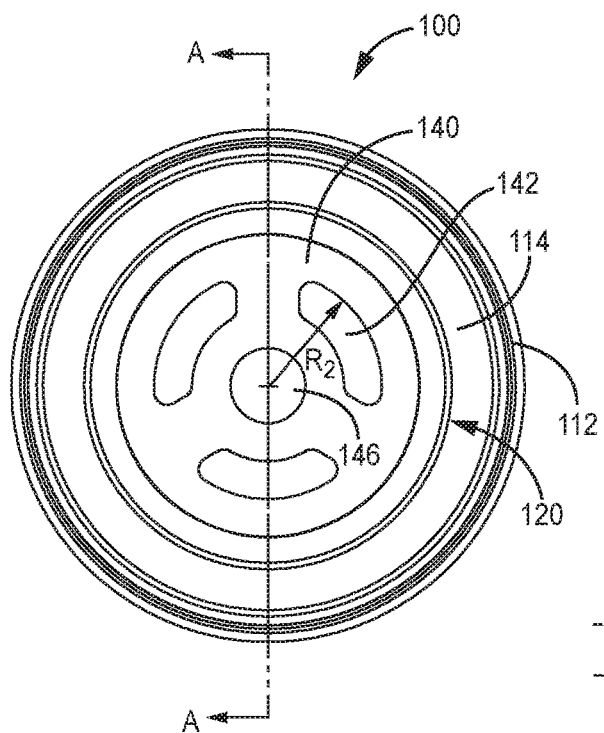
FIG. 3 is a facing view of the example vent assembly of FIG. 1.
Figure 4:
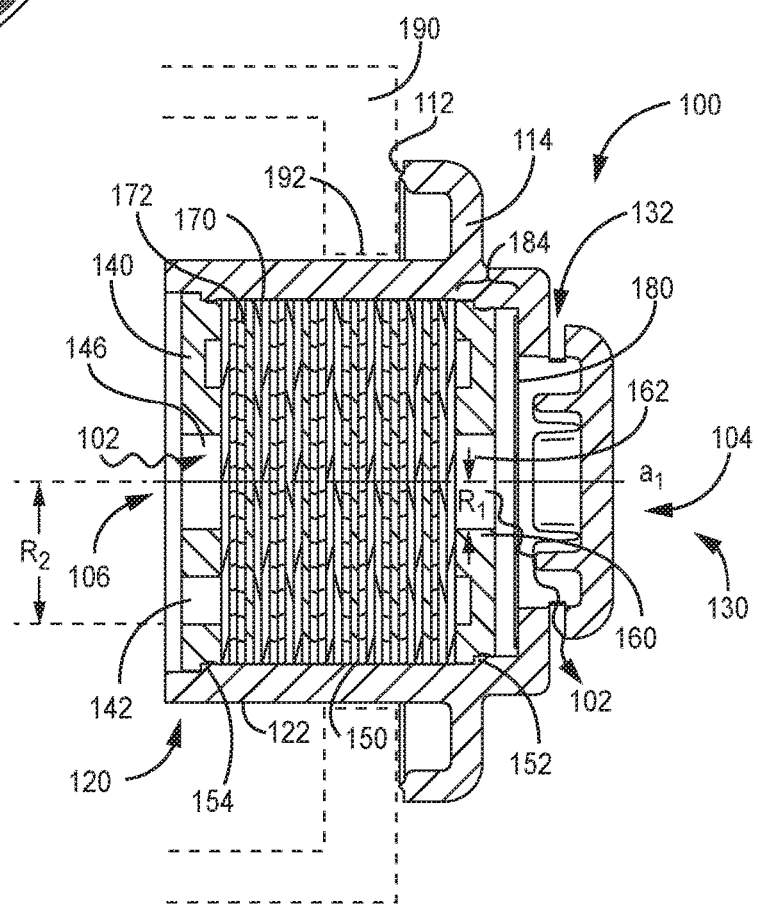
FIG. 4 is a cross-sectional view of the example vent assembly of FIG. 1 in an example implementation.
Figure 5:
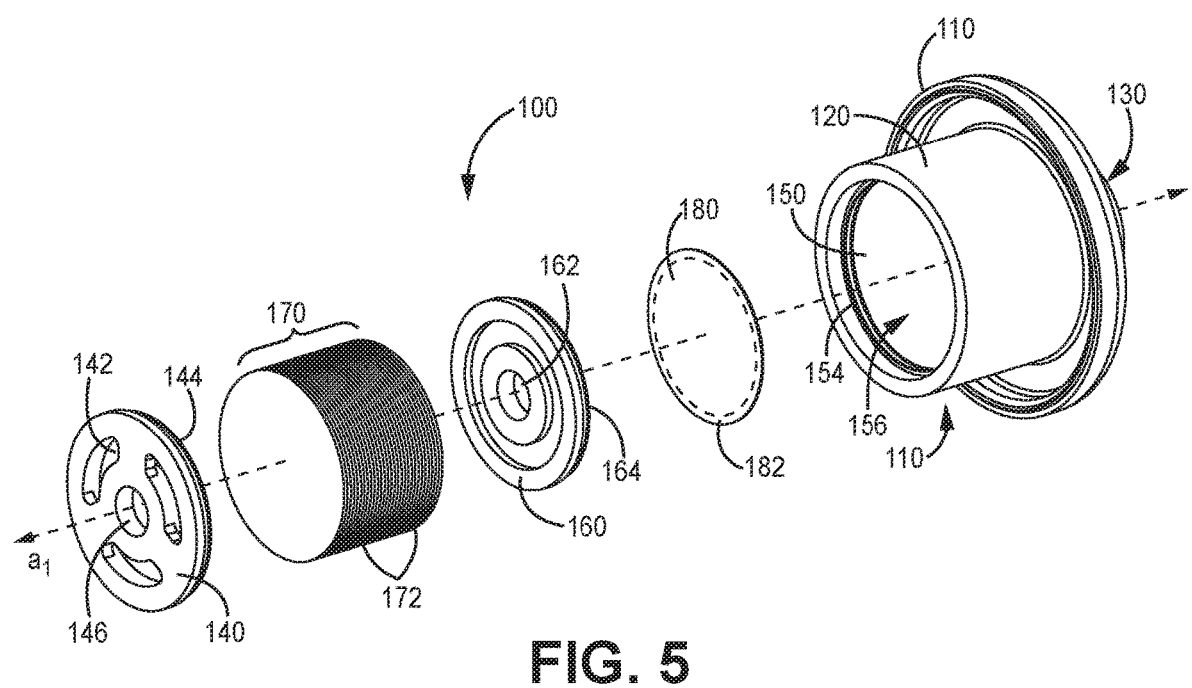
FIG. 5 is an exploded view of the example vent assembly of FIG. 1.

FIGS. 1-5 depict an example vent assembly 100 consistent with certain embodiments. FIGS. 1-2 are perspective views, FIG. 3 is a facing view of the second side of the vent assembly 100, FIG. 4 is a cross-sectional view of the vent of FIG. 3 in an example implementation, and FIG. 5 is an exploded view of the vent assembly 100. The vent assembly 100 has a vent body 110 defining a first end 104 and a second end 106. The vent body 110 has an inner surface 150 defining a cavity 156. A first retainer 160 defining at least one first retainer opening 162 extends from the inner surface 150 across the cavity 156 towards the first end 104 of the vent body 110. A second retainer 140 defining at least one second retainer opening 142 extends from the inner surface 150 across the cavity 156 towards the second end 106 of the vent body 110.

The vent assembly 100 is generally configured to couple to a housing 190 (FIG. 4) to vent the housing 190 to the surrounding environment. The vent assembly 100 defines an airflow pathway 102 between the first end 104 and the second end 106. The cavity 156, the first retainer opening 162, and the second retainer opening 142 cumulatively define the airflow pathway 102. The airflow pathway 102 is configured to be in fluid communication with the interior of the housing 190 to which the vent assembly 100 is coupled.

The vent body 110 is configured to be sealably coupled to the housing 190 about an opening 192 defined by the housing 190 meaning that the vent body 110 and the housing 190 form a seal about the opening 192. The vent assembly 100 can be coupled to the housing 190 through a variety of mechanisms, but in examples consistent with the current embodiment, the vent body 110 is bonded to the housing 190 at a coupling surface 112 about the opening 192 of the housing 190. The vent body 110 can be bonded to the housing 190 through welding, adhesive, and the like. Further, the second end 106 of the vent body 110 defines an insertion portion 120 that is configured to be received by the opening 192 defined by the housing 190. The vent body 110 has a retaining rim 114 that extends radially outward from the insertion portion 120. The coupling surface 112 is defined by an outer portion of the retaining rim 114 about the insertion portion 120. In some embodiments the coupling surface 112 is an annular surface that surrounds the insertion portion 120. Alternative and additional configurations for coupling the vent assembly to a housing 190 will also be described below with reference to other example embodiments.

In a variety of example implementations, the housing 190 is configured to contain oil. As an example, the housing 190 can be a hubcap window defining an opening through which the insertion portion 120 of the vent assembly 100 is configured to be inserted. In such implementations, the second end 106 of the vent body 110 is exposed to oil. Oil coalescing filter media 170 is disposed in the cavity 156 between the first retainer 160 and the second retainer 140. The second retainer opening 142 is in gaseous and liquid communication with the coalescing filter media 170. The first retainer opening 162 is at least in gaseous communication with the coalescing filter media 170. The coalescing filter media 170 is generally configured to coalesce oil and enable the eventual expulsion of the oil from the vent assembly 100. The coalescing filter media 170 can also be configured to hinder wicking of the oil throughout the coalescing filter media 170. In one example, such functionality is obtained by providing an oleophobic coating on the coalescing filter media 170.

The coalescing filter media 170 can have a variety of configurations and compositions, which will be described in more detail, below. The coalescing filter media 170 is generally configured to allow air exchange between the housing 190 and the environment outside of the housing 190. As such, the coalescing filter media 170 also defines the airflow pathway 102. In embodiments, the coalescing filter media 170 is a plurality of layers of sheets 172 each defining opposite flow faces, where the plurality of layers of sheets 172 are arranged in a series in the airflow pathway 102. The term "flow face" is defined as the surface of a sheet that is configured to be perpendicular to the general direction of airflow through the airflow pathway 102.

The first retainer 160 and the second retainer 140 are each configured to maintain the position of the coalescing filter media 170 relative to the vent body 110 and allow airflow there-through. At least the second retainer 140 is configured to allow fluid flow there-through. Each of the first retainer 160 and the second retainer 140 are configured to be mechanically fixed to the vent body 110. In various embodiments, each of the first retainer 160 and the second retainer 140 form a frictional fit with the vent body 110. The first retainer 160 defines a first retainer mating surface 164 (FIG.

5) that is configured to frictionally engage a first mating structure 152 (visible in FIG. 4) defined by the inner surface 150 of the vent body 110. The second retainer 160 defines a second retainer mating surface 144 that is configured to frictionally engage a second mating structure 154 defined by the inner surface 150 of the vent body. In some embodiments, the first retainer 160 and the second retainer 140 are additionally or alternatively mechanically fixed to the vent body 110 with an adhesive and/or a fastening device, such as a screw. In a variety of embodiments, the first retainer 160 and the second retainer 140 abut the coalescing filter media 170. In a variety of embodiments, the first retainer 160 and the second retainer 140 directly contact the coalescing filter media 170. In some embodiments, the coalescing filter media 170 is compressed between the first retainer 160 and the second retainer 140.

The first retainer 160 and the second retainer 140 are configured to enable the expulsion of oil from the vent body 110. The vent body 110 defines a central axis $a_1$ extending from the first end 104 to the second end 106. The vent body 110 is configured to rotate about its central axis $a_1$ when installed in the housing 190. For example, the housing 190 can also be configured to rotate about the central axis $a_1$ of the vent body 110 such that rotation of the housing 190 results in equal rotation of the vent body 110. The rotation of the vent body 110 generates inertial forces that have a centrifugal effect on the oil in the coalescing filter media 170, translating the oil radially outward towards the inner surface 150 of the vent body 110. At least one second retainer opening 142 of the second retainer 140 is radially closer to the inner surface 150 than the first retainer opening(s) 162 of the first retainer 160. In other words, the first retainer opening 162 extends to a first radial distance $R_1$ from the central axis $a_1$, the second retainer opening 142 extends to a second radial distance $R_2$ from the central axis $a_1$, and the second radial distance $R_2$ is greater than the first radial distance $R_1$. As such, when oil in the coalescing filter media 170 is translated radially outward towards the inner surface 150 of the vent body 110, the second retainer opening 142 defines a pathway for the oil to be expelled from the vent body 110.

The second retainer 140 can define one or more additional openings, such as a central opening 146 visible in FIGS. 1, 3, 4 and 5, that do not necessarily extend a greater radial distance from the central axis $a_1$ than the first retainer opening 162 defined by the first retainer.

The vent assembly 100 is generally configured to prevent the ingress of environmental contaminants to the housing 190 such as liquids and dust. In various embodiments, including those consistent with the current figures, the vent assembly 100 has a membrane 180 disposed across the cavity 156 and, therefore, across the airflow pathway 102. A perimeter region 182 of the membrane 180 is coupled to the inner surface 150 of the vent body 110 such that the membrane partially defines the airflow pathway 102. In various embodiments, a spacing region 184 is defined between the membrane 180 and the coalescing filter media 170 to prevent contact between oil and the membrane 180. In examples consistent with the current embodiment, the first retainer 160 is disposed between the coalescing filter media 170 and the membrane 180. As such, the first retainer 160 partially defines the spacing region 184. Further, in some embodiments, such as the one currently depicted, the vent body 110 defines a space between the membrane 180 and the first retainer 160. Membranes consistent with the technology disclosed herein are described in more detail, below.

The vent body 110 generally has an endcap portion 130 on the first end 104 that extends over the cavity 156. The endcap portion 130 is configured to shield the cavity 156 from the direct impact of environmental contaminants, such as water and debris, while allowing venting through the first end 104 of the vent body 110. In examples, the endcap portion 130 is configured to shield the flow faces of the membrane 180 from the direct impact of environmental contaminants.

The endcap portion 130 defines radial endcap openings 132 that partially define the airflow pathway 102 through the vent assembly 100. The radial endcap openings 132 are in gaseous communication with the first retainer opening 162. Given the position of the membrane 180 between the endcap portion 130 and the first retainer opening 162, the radial endcap openings 132 are not in liquid communication with the first retainer opening 162 in this example. In a variety of embodiments, the endcap portion 130 and the vent body 110 define a cohesive, unitary component. In such embodiments the endcap portion 130 and the vent body 110 can be molded as a single structure.

The vent body 110 can have a variety of configurations. In various embodiments, the vent body 110 is a cohesive unitary structure, although in some other embodiments the vent body has multiple components and thus is not a cohesive, unitary structure, examples of which will be described in more detail, below. In various examples, the vent body 110 has radial symmetry about the central axis $a_1$. In some examples, a portion of the inner surface 150 of the vent body 110 defines an inner cylindrical surface that has a circular cross-section through the plane perpendicular to the central axis $a_1$, although in some other examples the inner surface 150 defines a surface having a polygonal cross-section, such as hexagon or octagon. In some examples, the insertion portion 120 defines an outer cylindrical surface, although in some other example the insertion portion 120 defines an outer prismatic surface. Other configurations are also certainly contemplated.

The vent bodies as disclosed herein can generally be constructed of a variety of materials and combinations of materials such as metals, plastics, ceramics, rubbers, and the like. In some embodiments the vent body is constructed of molded components. In another embodiment the vent body is constructed of machined components.

Figure 6:
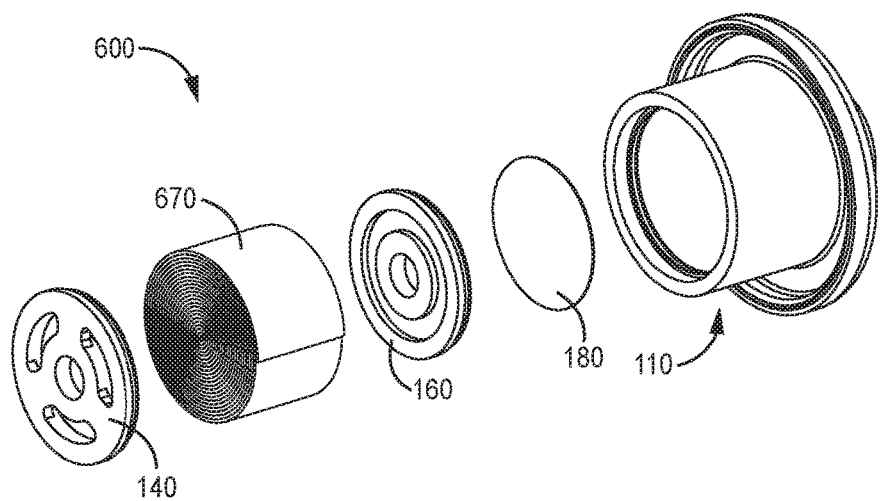
FIG. 6 is an exploded view of another example vent having an alternate media configuration.

FIG. 6 depicts another example vent assembly 600. The vent assembly 600 is consistent with the embodiment depicted in FIGS. 1-5, having a vent body 110, a membrane 180, a first retainer 160 and a second retainer 140 and a coalescing filter media 670, but here the coalescing filter media 670 has an alternate configuration than previously described. The coalescing filter media 670 is a sheet of media that has been rolled into a spiral configuration. Alternately, the coalescing filter media 670 can be multiple sheets of media that have been rolled together in a spiral configuration. In an alternate embodiment, the coalescing filter media can have a different configuration, such as a singular mass of coalescing filter media.

FIGS. 7-9

Figure 7:
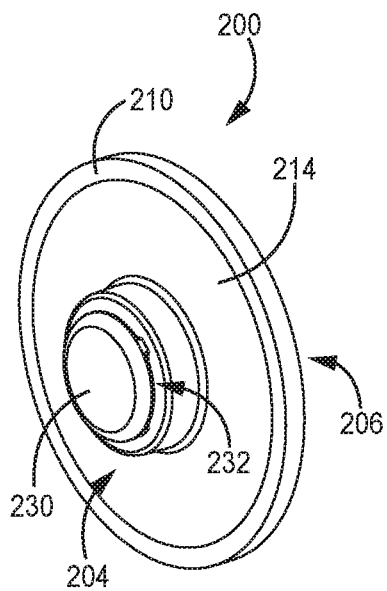
FIG. 7 is a perspective view of another example vent assembly consistent with the technology disclosed herein.
Figure 8:
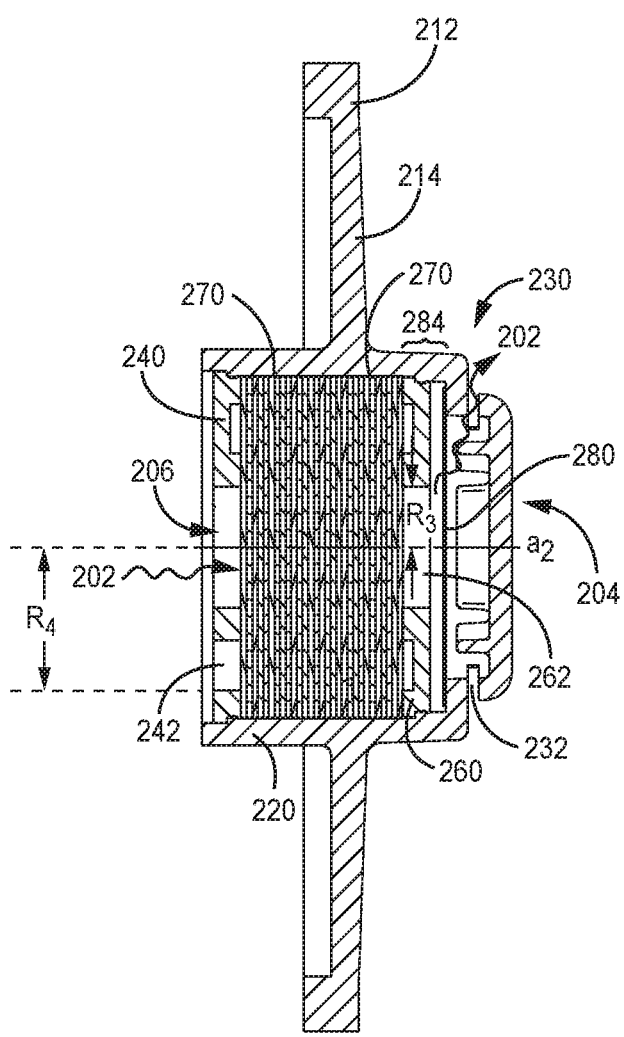
FIG. 8 is a cross-sectional view of the example vent assembly of FIG. 7.
Figure 9:
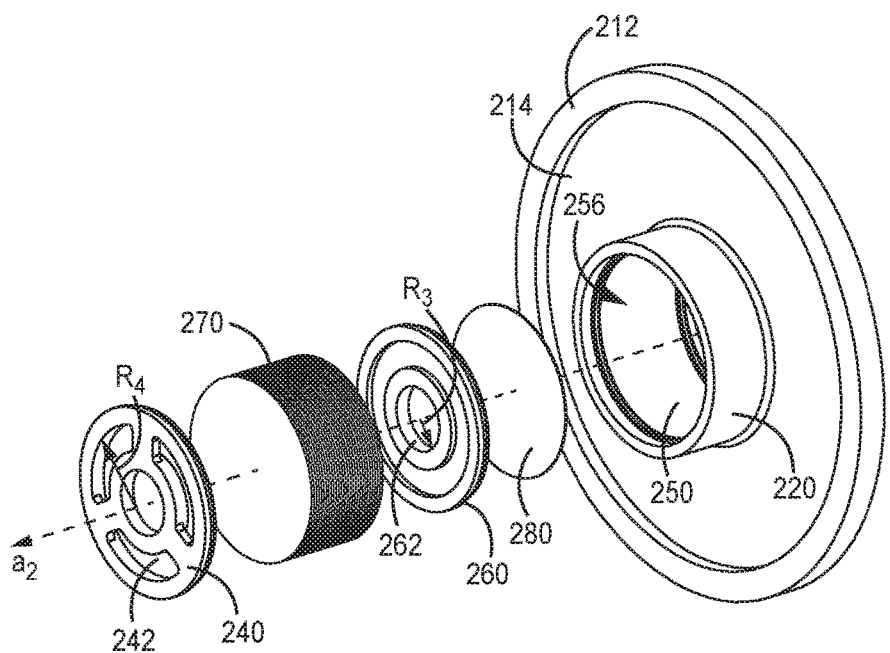
FIG. 9 is an exploded view of the example vent assembly of FIG. 7

FIGS. 7, 8 and 9 depict another embodiment consistent with some examples. FIG. 7 is a perspective view of the vent assembly 200, FIG. 8 is a cross-sectional view of the vent assembly 200, and FIG. 9 is an exploded view of the vent assembly 200. The vent assembly 200 has a vent body 210 defining a first end 204 and a second end 206. The vent body 210 has an inner surface 250 defining a cavity 256. The vent body 210 defines a central axis $a_2$ extending from the first end 204 to the second end 206. The vent assembly 200 defines an airflow pathway 202 between the first end 204 and the second end 206.

A first retainer 260 defining a first retainer opening 262 extends from the inner surface 250 across the cavity 256 towards the first end 204 of the vent body 210. The first retainer opening 262 extends to a first radial distance $R_3$ from the central axis $a_2$. A second retainer 240 defining a second retainer opening 242 extends from the inner surface 250 across the cavity 256 towards the second end 206 of the vent body 210. The second retainer opening 242 extends to a second radial distance $R_4$ from the central axis $a_2$, and the second radial distance $R_4$ is greater than the first radial distance $R_3$. The first retainer 260 and the second retainer 240 can have similar functionalities and configurations as described above with respect to FIGS. 1-5.

Oil coalescing filter media 270 is disposed in the cavity 256 between the first retainer 260 and the second retainer 240. The second retainer opening 242 is in gaseous and liquid communication with the coalescing filter media 270. The first retainer opening 262 is at least in gaseous communication with the coalescing filter media 270. The coalescing filter media 270 can have similar functionalities and configurations as described above with respect to FIGS. 1-6.

The vent assembly 200 has a membrane 280 disposed across the cavity 256 and, as such, across the airflow pathway 202. The membrane 280 is coupled to the inner surface 250 of the vent body 210. The first retainer 260 is disposed between the coalescing filter media 270 and the membrane 280. A spacing region 284 is defined between the coalescing filter media 270 and the membrane 280. Similar to the examples described above, the first retainer 260 defines a portion of the spacing region 284. The membrane has functionalities and configurations as described above with respect to FIGS. 1-5.

The vent body 210 has an endcap portion 230 on the first end 204 that extends over the cavity 256. The endcap portion 230 defines radial endcap openings 232 that accommodate airflow through the vent assembly 200. The radial endcap openings 232 are in gaseous communication with the first retainer opening 262. The radial endcap openings 232 are not in liquid communication with the first retainer opening 262 in this example. In a variety of embodiments, the endcap portion 230 and the vent body 210 define a cohesive, unitary component. In such embodiments the endcap portion 230 and the vent body 210 can be molded as a single structure. The endcap portion 230 has consistent functionalities and configurations as described above with respect to FIGS. 1-5.

The cavity 256, the coalescing filter media 270, the first retainer opening 262, the second retainer opening 242, the membrane 280 and the endcap openings 232 cumulatively define the airflow pathway 202. The airflow pathway 202 is configured to be in fluid communication with the interior of a housing to which the vent assembly 200 is coupled.

Similar to the examples previously described, the vent body 210 is configured to be sealably coupled to a housing. The second end 206 of the vent body 210 defines an insertion portion 220 that is configured to be received by an opening defined by the housing. The vent body 210 has a retaining rim 214 that extends radially outward from the insertion portion 220. A coupling surface 212 is defined by an outer portion of the retaining rim 214 that is configured to be coupled to the housing. The coupling surface 212 can be coupled to the housing via a weld, adhesive, fasteners (with corresponding sealing components abutting the fasteners), and the like.

As described above, in some implementations, the housing is configured to contain oil. The housing can be a hubcap defining an opening through which the insertion portion 220 of the vent assembly 200 is configured to be inserted. In some such implementations where the housing is an oil hub, the retaining rim 214 defines a hub window that is configured to be coupled to a hub about an opening defined in the hub. In such embodiments, the retaining rim 214 can be at least semi-transparent to allow viewing into the hub. The coupling surface 212 of the retaining rim 214 can be configured to be received by a radial clamp with a gasket or other sealing material disposed between the coupling surface 212 and the radial clamp. In some other embodiments, the coupling surface 212 can be coupled to the hub via a weld or with an adhesive. Alternatively, the sealing surface 212 can be omitted and the retaining rim 214 can be integrated in the hub as a unitary, cohesive component.

In embodiments, the retaining rim 214 can be a separate, distinct component from the vent body 210. In such embodiments, the retaining rim 214 can define an opening that is configured to receive the insertion portion 210 of the vent body 210 where the insertion portion 210 and the retaining rim 214 form a frictional fit about the opening. In some other embodiments, the retaining rim 214 and the vent body 210 are a cohesive, unitary component, as described above with reference to FIGS. 1-5. In embodiments where the retaining rim 214 is transparent or semi-transparent, the retaining rim 214 and the rest of the vent body 210 can be molded with two different materials or with a single material containing colorant in portions used to mold the vent body 210 and omitting colorant in portions used to mold the retaining rim 214. The vent body 210 can otherwise be configured similarly as described above with reference to FIGS. 1-5.

FIGS. 10-12

Figure 10:
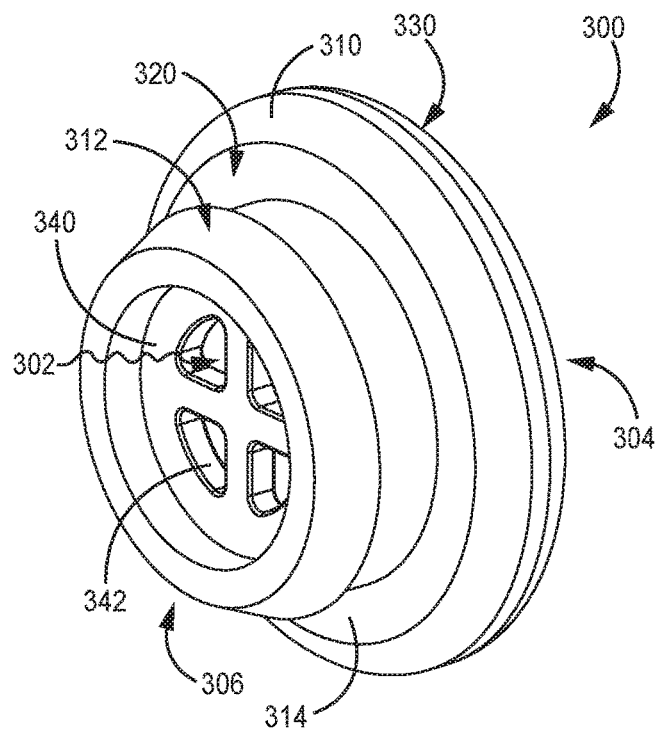
FIG. 10 is a perspective view of yet another example vent assembly consistent with the technology disclosed herein.
Figure 11:
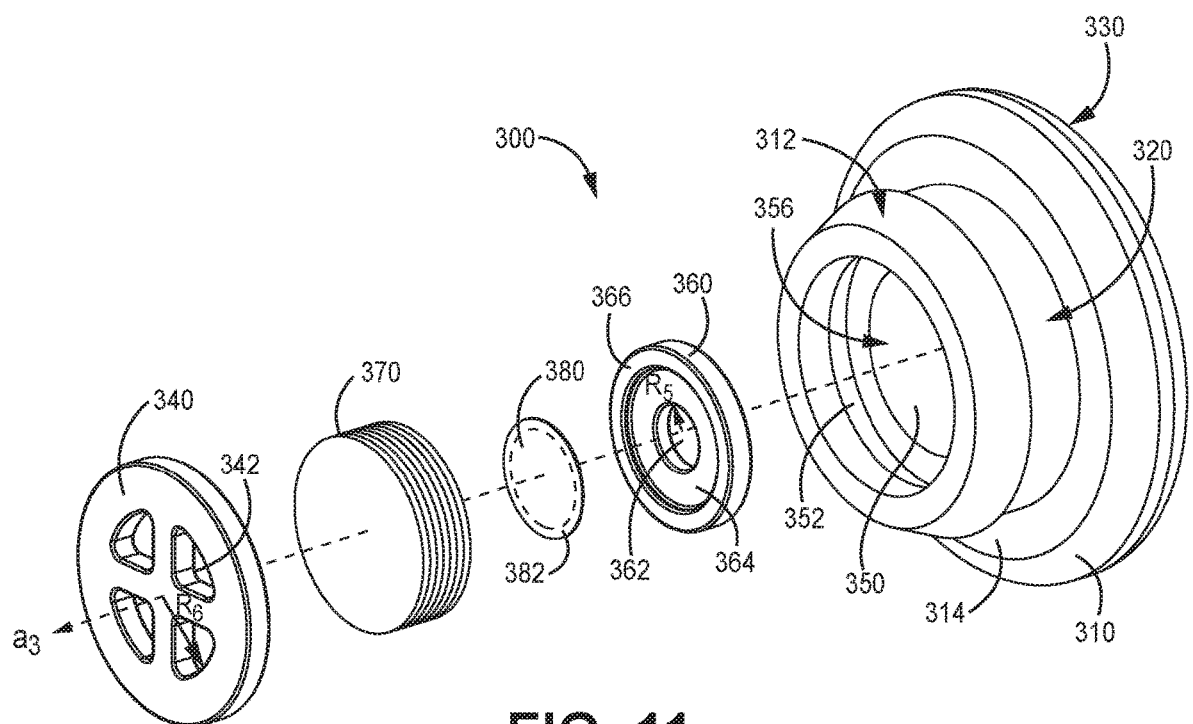
FIG. 11 is an exploded view of the vent assembly of FIG. 10.
Figure 12:
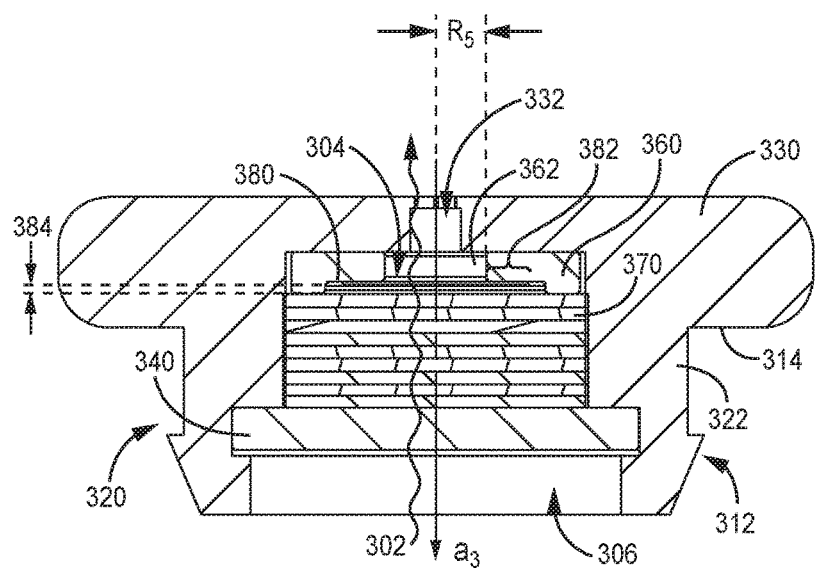
FIG. 12 is a cross-sectional view of the vent assembly of FIG. 10.

FIGS. 10-12 depict another embodiment consistent with some examples. FIG. 10 is a perspective view of the vent assembly 300, FIG. 11 is an exploded view of the vent assembly 300 and FIG. 12 is a cross-sectional view of the vent assembly 300. The vent assembly 300 has a vent body 310 defining a first end 304 and a second end 306. The vent body 310 has an inner surface 350 defining a cavity 356. The vent body 310 defines a central axis $a_3$ extending from the first end 304 to the second end 306. The vent assembly 300 defines an airflow pathway 302 between the first end 304 and the second end 306.

A first retainer 360 defining a first retainer opening 362 extends from the inner surface 350 across the cavity 356 towards the first end 304 of the vent body 310. The first retainer opening 362 extends to a first radial distance $R_5$ from the central axis $a_3$. A second retainer 340 defining at least one second retainer opening 342 extends from the inner surface 350 across the cavity 356 towards the second end 306 of the vent body 310. In the current example, the second retainer openings 342 define a different shape than the second retainer openings of previous examples. However, similar to the previous examples, the second retainer opening 342 extends to a second radial distance $R_6$ from the central axis $a_3$, and the second radial distance $R_6$ is greater than the first radial distance $R_5$. The first retainer 360 and the second retainer 340 can be coupled to the vent body 310 similarly to previously-described embodiments. In the current embodiment, the first retainer 360 has an alternate configuration from previously-described embodiments which will now be described.

The vent assembly 300 has a membrane 380 disposed across the airflow pathway 302. Unlike the examples described above, the membrane 380 is disposed between the coalescing filter media 370 and the first retainer 360. Also, a perimeter region 382 of the membrane 380 is coupled to a membrane receiving surface 364 of the first retainer 360 about the first retainer opening 362. Similar to the examples described above, a spacing region 384 is defined between the coalescing filter media 370 and the membrane 380, and the first retainer 360 defines a portion of the spacing region 384. However, here the spacing region 384 is defined by a ledge 366 surrounding the membrane receiving surface 364 of the first retainer 360. The ledge 366 of the first retainer 360 abuts the coalescing filter media 370 and the membrane receiving surface 364 is recessed relative to the ledge 366 by a distance greater than the thickness of the membrane 380. The membrane has functionalities and configurations as described above with respect to FIGS. 1-5.

Oil coalescing filter media 370 is disposed in the cavity 356 between the first retainer 360 and the second retainer 340. The second retainer opening 342 is in gaseous and liquid communication with the coalescing filter media 370. The first retainer opening 362 is at least in gaseous communication with the coalescing filter media 370. The coalescing filter media 370 can have similar functionalities and configurations as described above with respect to FIGS. 1-6.

The vent body 310 has an endcap portion 330 on the first end 304 that extends over the cavity 356. The endcap portion 330 defines an endcap opening 332 that accommodates airflow through the vent assembly 300. Unlike previously disclosed embodiments, the endcap opening 332 is in axial alignment with the central axis $a_3$. The endcap opening 332 is sized to shield the cavity 356 from the direct impact of environmental contaminants, such as water and debris while allowing venting. As such, the endcap opening 332 has a smaller area than the face of the membrane 380 and the first retainer opening 360. The endcap opening 332 is in gaseous and liquid communication with the first retainer opening 362. The endcap portion 330 and the vent body 310 define a cohesive, unitary component. In such embodiments the endcap portion 330 and the vent body 310 can be molded as a single structure. In some alternative embodiments, the endcap portion 330 can have a similar configuration as described above with respect to FIGS. 1-5.

The cavity 356, the coalescing filter media 370, the first retainer opening 362, the second retainer opening 342, the membrane 380 and the endcap opening 332 cumulatively define the airflow pathway 302. The airflow pathway 302 is configured to be in fluid communication with the interior of a housing to which the vent assembly 300 is coupled.

Similar to the examples previously described, the vent body 310 is configured to be sealably coupled to a housing. The second end 306 of the vent body 310 defines an insertion portion 320 that is configured to be received by an opening defined by the housing that is to be vented. The vent body 310 has a retaining rim 314 that extends radially outward from the insertion portion 320. Unlike previously-described embodiments, here a coupling surface 312 is defined by the insertion portion 320. The coupling surface 312 is configured to mechanically engage the housing. The coupling surface 312 can be configured to define a snap-fit with the housing. The vent body 310 can be configured to be coupled to the housing through additional approaches such as those described above and/or via a weld, adhesive, fasteners (with corresponding sealing structures), and the like. In some alternate embodiments the coupling surface 312 currently described can be omitted and other coupling surfaces described herein can be incorporated into the currently-described example.

As described above, in some implementations, the housing is configured to contain oil. The housing can be a hubcap defining an opening through which the insertion portion 320 of the vent assembly 300 is configured to be inserted and which the coupling surface 314 engages. In some such implementations where the housing is a hub cap, the opening can be defined in a hub cap window of a hub cap.

FIGS. 13-15

Figure 13:
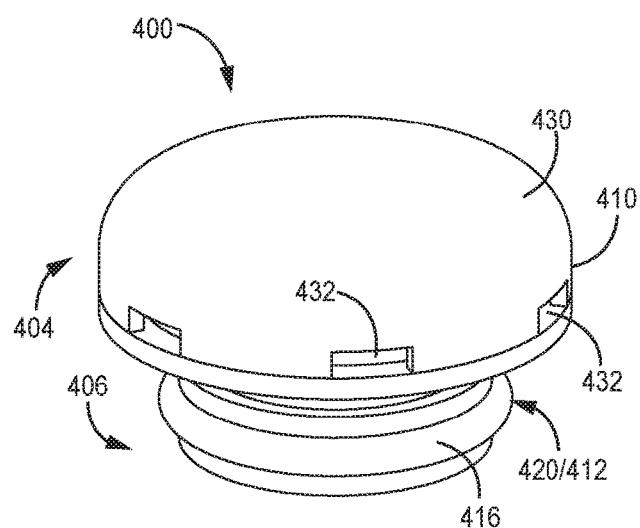
FIG. 13 is a perspective view of yet another example vent assembly consistent with the technology disclosed herein.
Figure 14:
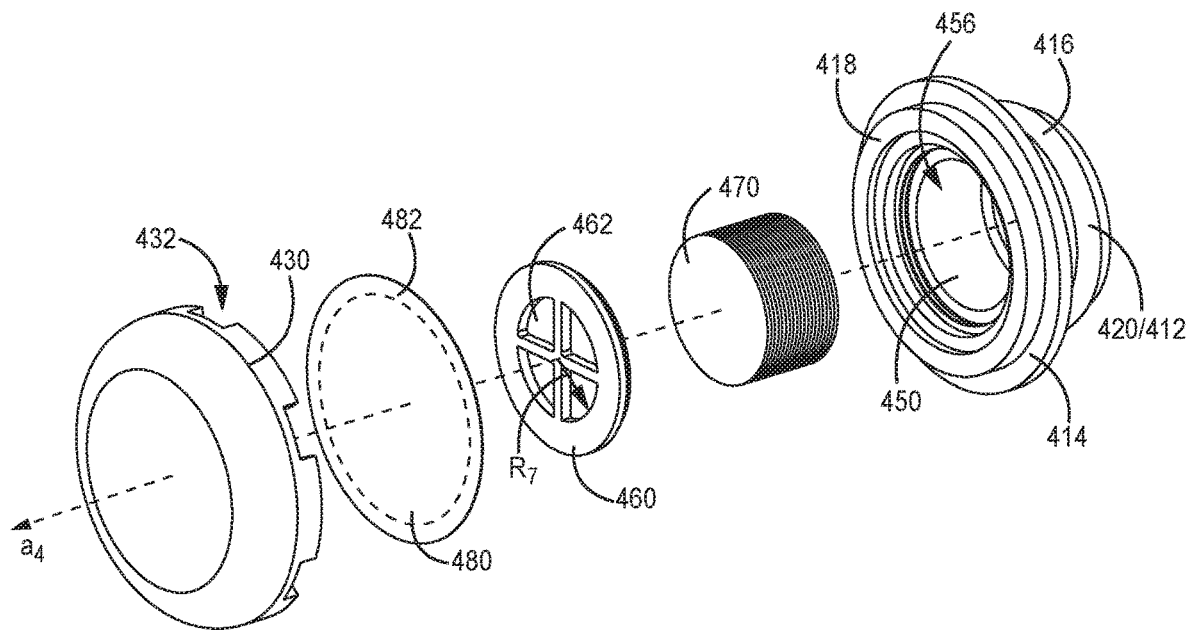
FIG. 14 is an exploded view of the vent assembly of FIG. 13.
Figure 15:
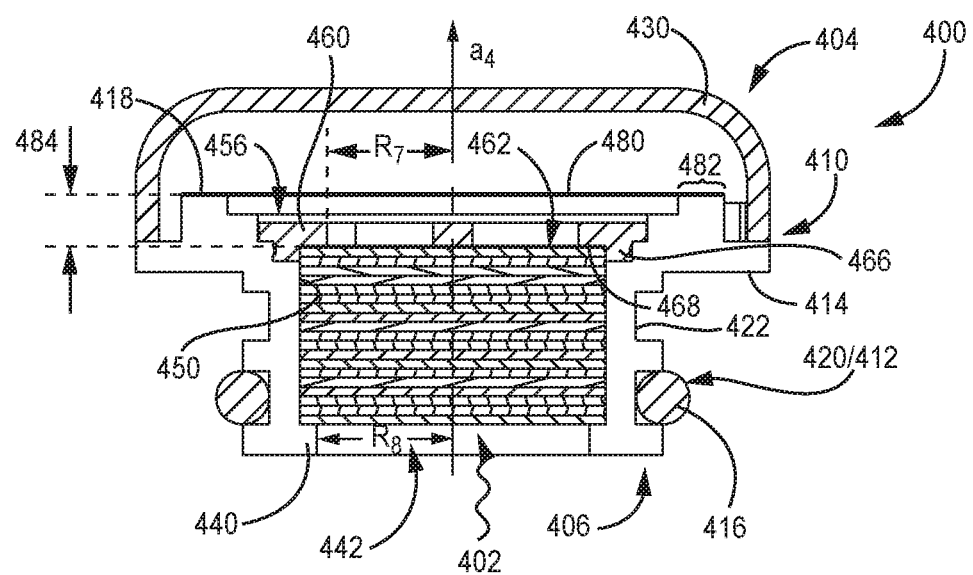
FIG. 15 is a cross-sectional view of the vent assembly of FIG. 13.

FIGS. 13-15 depict another embodiment consistent with some examples. FIG. 13 is a perspective view of the vent assembly 400, FIG. 14 is an exploded view of the vent assembly 400 and FIG. 15 is a cross-sectional view of the vent assembly 400. The vent assembly 400 has a vent body 410 defining a first end 404 and a second end 406. The vent body 410 has an inner surface 450 defining a cavity 456. The vent body 410 defines a central axis $a_4$ extending from the first end 404 to the second end 406. The vent assembly 400 defines an airflow pathway 402 between the first end 404 and the second end 406.

Oil coalescing filter media 470 is disposed in the cavity 456 between a first retainer 460 defining a first retainer opening 462 and a second retainer 440 defining a second retainer opening 442. The second retainer opening 442 is in gaseous and liquid communication with the coalescing filter media 470. The first retainer opening 462 is at least in gaseous communication with the coalescing filter media 470. The first retainer opening 462 is also in liquid communication with the coalescing filter media 470. The coalescing filter media 470 can have similar functionalities and configurations as described above with respect to FIGS. 1-6.

The first retainer 460 extends from the inner surface 450 across the cavity 456 towards the first end 404 of the vent body 410. The first retainer opening 462 extends to a first radial distance $R_7$ from the central axis $a_4$. In the current example, the first retainer opening 462 defines a plurality of openings that are a different shape than the first retainer openings of previous examples. As an alternate example, the first retainer opening 462 can be a single central opening as depicted in previous illustrations. The second retainer 440 extends from the inner surface 450 across the cavity 456. The second retainer 440 is positioned towards the second end 406 of the vent body 410. The second retainer opening 442 defines a different shape than the second retainer openings of previous examples in that the second retainer opening 442 is a single opening axially aligned with the central axis $a_4$. However, similar to the previous examples, the second retainer opening 442 extends to a second radial distance $R_8$ from the central axis $a_4$, and the second radial distance $R_8$ is greater than the first radial distance $R_7$. Unlike previous examples, in the current example the second retainer 440 forms a cohesive, unitary component with the vent body 410.

The vent assembly 400 has a membrane 480 disposed across the air pathway 402. The membrane generally has functionalities and configurations as described above with respect to FIGS. 1-5. The first retainer 460 is disposed between the coalescing filter media 470 and the membrane 480. A perimeter region 482 of the membrane 480 is coupled to a membrane receiving surface 418 of the vent body 410 across the cavity 456. Similar to the examples described above, a spacing region 484 is defined between the coalescing filter media 470 and the membrane 480. The first retainer 460 defines at least a portion of the spacing region 484. In particular, the spacing region 484 is defined by the membrane receiving surface 418 of the vent body 410 on one side of the first retainer 460 and a media receiving surface 468 defined on the opposite side of the first retainer 460. The media receiving surface 468 of the first retainer 460 abuts the coalescing filter media 470. The media receiving surface 468 is recessed relative to a surrounding ledge 466 and is configured to receive the coalescing filter media 470.

The vent body 410 has an endcap portion 430 on the first end 404 that extends over the cavity 456. The endcap portion 430 defines a plurality of radial endcap openings 432 that accommodates airflow through the vent assembly 400. The endcap 430 and the endcap openings 432 are configured to shield the cavity 456 from the direct impact of environmental contaminants, such as water and debris while allowing venting through the vent body 410. The endcap openings 432 are in gaseous communication with the first retainer opening 462. The endcap openings 432 are not in liquid communication with the first retainer opening 462 due to the position of the membrane 480 between the endcap portion 430 and the first retainer 460. Unlike previous embodiments, the endcap portion 430 and the vent body 410 do not define a cohesive, unitary component. The endcap portion 430 and the vent body 410 can be manufactured as separate structures. In some embodiments, the endcap portion 430 and the vent body 410 are molded separately and then are coupled together. For example, the vent body 410 and the endcap portion 430 can form a frictional fit. In some alternative embodiments, the endcap portion 430 can have a similar configuration as described above with respect to FIGS. 1-5 or FIGS. 10-12.

The cavity 456, the coalescing filter media 470, the first retainer opening 462, the second retainer opening 442, the membrane 480 and the endcap opening 432 cumulatively define the airflow pathway 402. The airflow pathway 402 is configured to be in fluid communication with the interior of a housing to which the vent assembly 400 is coupled.

Similar to the examples previously described, the vent body 410 is configured to be sealably coupled to a housing, where possible housings have been described in previous examples. The second end 406 of the vent body 410 defines an insertion portion 420 that is configured to be received by an opening defined by the housing that is to be vented. The vent body 410 has a retaining rim 414 that extends radially outward from the insertion portion 420. A coupling surface 412 is defined by the insertion portion 420. The coupling surface 412 is configured to mechanically engage the housing. A sealing ring 416 is disposed about the coupling surface to form a seal between the insertion portion 420 of the vent body 410 and the housing. The coupling surface 412 can be configured to define a snap-fit with the housing. The vent body 410 can be configured to be coupled to the housing through additional approaches such as those described above and/or via a weld, adhesive, fasteners, and the like. In some alternate embodiments the coupling surface 412 currently described can be omitted and other coupling surfaces described herein can be incorporated into the currently-described example.

Method of Manufacturing

Figure 16:
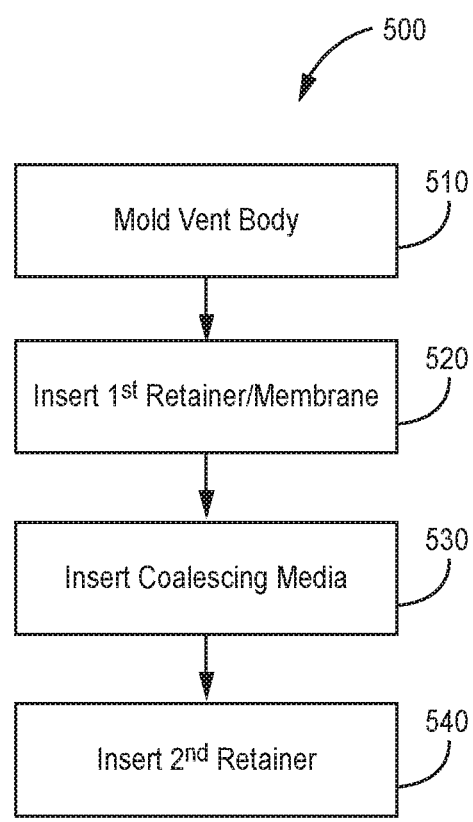
FIG. 16 is a flow chart of an example method.

FIG. 16 depicts an example method 500 for making a vent assembly consistent with some embodiments of the technology disclosed herein. A vent body is molded 510. A first retainer/membrane is inserted in the cavity of the vent body 520. Coalescing filter media is inserted in the cavity 530 and a second retainer 540 is inserted in the cavity.

The vent body is generally molded to have an insertion portion at a first end, an inner surface, and an endcap portion at a second end. The insertion portion, inner surface and the endcap portion generally form a cohesive, unitary component. The inner surface is molded to define a cavity and the vent body defines a central axis extending from the first end to the second end. The vent body is molded such that the endcap portion defines radial openings in fluid communication with the cavity. In various embodiments the vent body is molded to define a retaining rim that extends radially outward from the insertion portion of the vent body.

The first retainer/membrane is inserted into the cavity 520. Generally the first retainer and the membrane are inserted into the cavity such that they each define a portion of an airflow pathway extending through the vent body. In some embodiment, the membrane is inserted in the cavity of the vent body before insertion of the first retainer. In such embodiments, a perimeter region of the membrane can be coupled to the inner surface of the vent body about the cavity such that the membrane extends across the airflow pathway. The membrane can be coupled to the inner surface of the vent body at the first end of the vent body. The first retainer is inserted into the cavity after inserting the membrane. Such an embodiment can be consistent with vent assembly configurations disclosed above with reference to FIGS. 1-9.

In some other embodiments, a perimeter region of the membrane can be coupled to the first retainer about an opening defined by the first retainer and then the membrane coupled to the first retainer can be inserted into the cavity 520, whereby inserting the membrane and inserting the first retainer is simultaneous. Such an embodiment can be consistent with vent assembly configurations disclosed in FIGS. 10-12. In a variety of embodiments, inserting the first retainer into the cavity of the vent body forms a frictional fit with the inner surface of the vent body. The membrane and the first retainer can be configured consistently with embodiments described herein.

After inserting the first retainer and the membrane into the cavity of the vent body 520, the coalescing filter media is inserted into the cavity of the vent body 530. In a variety of embodiments, a plurality of layers of sheets of coalescing filter media is inserted into the cavity of the vent body 530, consistently with vent assemblies depicted and described herein. In some alternate embodiments, the coalescing media and the membrane can be overmolded. For example, the membrane can be overmolded to the first retainer in some embodiments. As another example, the coalescing media can be overmolded to the vent body. Other approaches are also possible.

After inserting the coalescing filter media, a second retainer is inserted into the second end of the cavity 540. Inserting the second retainer 540 forms a frictional fit between the second retainer and the inner surface of the vent body. The second retainer can be configured consistently with embodiments described herein.

In some embodiments, the insertion portion of the vent body is then inserted into an opening defined by a hubcap window. In some embodiments, the vent body is welded to the hubcap window. In some other embodiments, the insertion portion of the vent body forms a frictional fit with the hubcap window. In some embodiments, the vent body is adhered to the hubcap window with an adhesive or fasteners.

Coalescing Filter Media

Coalescing filter media consistent with the technology disclosed herein can have a variety of configurations that will now be described. The coalescing filter media is generally configured to coalesce oil and enable the eventual expulsion of the oil from the vent assembly. In various embodiments the coalescing filter media is Synteq XP, a proprietary filter material manufactured by Donaldson Company, Inc. in Minneapolis, Minn. The coalescing filter media is configured to partially define the airflow pathway through the cavity of the vent body. The coalescing filter media is generally not a sorbent of oil. In multiple embodiments, the coalescing filter media is oleophobic. The coalescing filter media can have an oleophobicity of at least about 6.5 based on AATCC Specification 118-2013 and ISO 14419. In one example the coalescing filter media has an oleophobicity of at least about 7 or 7.5, and more particularly can have an oleophobicity of about 8.

Coalescing filter media can be a stack of a plurality of layers of synthetic filter media. The number of layers of coalescing filter media can vary, but in some embodiments there are 5-20, 15-35, 20-40, or 25-50 layers of coalescing filter media. A substantial portion of the layers can be stacked such that each flow face of each layer of filter media is in direct contact with the flow faces of adjacent layers of filter media. In a variety of embodiments, each of the layers of coalescing filter media are centrally aligned with the central axis of the vent body. Each of the individual layers of filter media can have a relatively low particle filtration efficiency and low pressure drop. Generally, each layer of synthetic filter media has a maximum particle filtration efficiency of 15%, 10%, or even 8%, wherein "particle filtration efficiency"—when used herein with regard to a single layer of filter media—refers to the particle filtration efficiency of the single layer of filter media as challenged by 0.78 micron monodisperse polystyrene spherical particles at a face velocity of 20 ft/min, measured according to ASTM #1215-89. In one particular embodiment, each layer of synthetic filter media has a particle filtration efficiency of about 7%. In some embodiments each layer of synthetic filter media in the coalescing filter media has about equal particle filtration efficiency. The relatively low particle filtration efficiency of each of the filtration layers can aid in oil removal by defining a relatively open pathway that provides less resistance to the oil when draining out of the coalescing region and towards the housing.

The coalescing filter media can be a variety of types of materials and combinations of materials. For example, the coalescing filter media can have bi-component fibers. The bi-component fibers can be constructed of two different polyesters. In some embodiments, the coalescing filter media can have glass fibers. In at least one embodiment the glass fibers are microfibers. Generally, the coalescing filter media substantially lacks a binder material, where the term "binder material" is defined herein to exclude the fibers in the coalescing region, such as the bi-component fibers or other fibers. Details about the materials used for the coalescing filter media, and particularly the coalescing filter media, will be described in more detail, below.

In a variety of embodiments, a substantial portion of each layer of the stacked layers of coalescing filter media is substantially unbonded to adjacent layers of coalescing filter media. A "substantial portion of each layer of the stacked coalescing filter media" is intended to mean at least 50%, at least 60% or at least 80% of the layers of synthetic filter media in the stack. The term "substantially unbonded" is used to mean that at least 97% of the surface area of the layer of filter media is unbonded. In some such embodiments, each layer of the stacked layers of coalescing filter media is substantially unbonded to adjacent layers of coalescing filter media. In some other embodiments, however, at least a portion of the layers of stacked coalescing filter media are bonded to adjacent layers of coalescing filter media. In one example embodiment, a portion of the layers of stacked coalescing filter media are thermally bonded to adjacent layers of coalescing filter media. In some embodiments, the coalescing filter media is not stacked sheets of filter media, and can be configured as a roll, a mat, or other form of media disposed between the first retainer and the second retainer. Regardless of the specific configuration of the filter media, in some embodiments, the coalescing filter media is under axial compression between the first retainer and the second retainer. Additionally or alternately, the coalescing filter media is under radial compression from the inner surface of the vent body.

Coalescing filter media consistent with the technology disclosed herein is generally a wet laid media. The wet laid media can be constructed consistently with, for example, U.S. Pub. No. 2012/0234748, filed on Mar. 16, 2012 or, in another example, U.S. Pat. No. 7,314,497, issued on Jan. 1, 2008, each of which are incorporated by reference herein. The wet laid media is formed in a sheet by wet laid processing, formed into disks, and is then inserted in the vent housing of the vent assembly. Typically, as described above, the wet laid media disks are stacked in a plurality of layers in the vent housing allowing expulsion of oil.

Membrane Materials

Various types of materials would be suitable for use as a membrane consistently with the embodiments disclosed above. Generally, the membrane is a microporous material, where the term "microporous" is intended to mean that the material defines pores having an average pore diameter between about 0.001 and about 5.0 microns. The membrane generally has a solidity of less than about 50% and a porosity of greater than about 50%. In a variety of embodiments, the membrane has a plurality of nodes interconnected by fibrils. In a number of embodiments the membrane is an expanded polytetrafluoroethylene (PTFE) membrane. The membrane can also be constructed of polyamide, polyethylene terephthalate, acrylic, polyethersulfone, and/or polyethylene, as other examples.

In some embodiments the membrane is a laminate having a membrane material laminated to a support layer, such as a scrim. For example, the membrane 160 can be a Tetratex™ grade from Donaldson Company, Inc., based in Minneapolis, Minn., which is laminated to a non-woven nylon support layer such as that available from Cerex Advances Fabrics, Inc. located in Cantonment, Fla. In some other embodiments the membrane is a self-supporting material, meaning that the membrane is not a laminate and is limited to the membrane material. In some other embodiments the membrane is a laminate of a support layer disposed between two membrane material layers.

In a number of embodiments the membrane is oleophobic. The membrane can have an oleophobic treatment. In one particular embodiment the membrane has an oleophobicity rating of 6, 7 or 8 based on AATCC Specification 118-1992 and ISO 14419.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as "arranged", "arranged and configured", "constructed and arranged", "constructed", "manufactured and arranged", and the like.

All publications and patent applications in this specification are indicative of the level of ordinary skill in the art to which the present technology pertains. All publications and patent applications are herein incorporated by reference to the same extent as if each individual publication or patent application was specifically and individually indicated by reference.

This application is intended to cover adaptations or variations of the present subject matter. It is to be understood that the above description is intended to be illustrative, and not restrictive.

We claim:

1. A vent assembly comprising:
   a vent body having an inner surface defining a cavity, wherein the vent body defines a first end and a second end and the vent body defines a central axis extending from the first end to the second end and the vent body has an insertion portion defining the second end of the vent body;
   a first retainer extending from the inner surface across the cavity, wherein the first retainer is positioned towards the first end of the vent body, wherein the first retainer defines a first retainer opening extending to a first radial distance from the central axis;
   a second retainer extending from the inner surface across the cavity, wherein the second retainer is positioned towards the second end of the vent body, wherein the second retainer defines a second retainer opening extending to a second radial distance from the central axis, wherein the second radial distance is greater than the first radial distance; and
   coalescing filter media disposed in the cavity between the first retainer and the second retainer; wherein the coalescing filter media, the cavity, the first retainer, and the second retainer cumulatively define an airflow pathway.

2. The vent assembly of claim 1, wherein the vent body defines a retaining rim that extends radially outward from the insertion portion.

3. The vent assembly of claim 1, wherein the vent body has an endcap portion on the first end that extends over the cavity.

4. The vent assembly of claim 3, wherein the endcap portion defines radial openings in gaseous communication with the first retainer opening.

5. The vent assembly of claim 3, wherein the endcap portion and the vent body form a cohesive, unitary component.

6. The vent assembly of claim 1, wherein the inner surface comprises an inner cylindrical surface.

7. The vent assembly of claim 1, wherein the second retainer and the vent body are a cohesive, unitary component.

8. The vent assembly of claim 1, wherein the second retainer forms a frictional fit with the vent body.

9. The vent assembly of claim 1, wherein the first retainer forms a frictional fit with the vent body.

10. The vent assembly of claim 1, further comprising a membrane, wherein the membrane is disposed across the airflow pathway between the coalescing filter media and the first retainer.

11. The vent assembly of claim 1, further comprising a membrane, wherein the first retainer is disposed across the cavity between the coalescing filter media and the membrane.

12. The vent assembly of claim 1, wherein the second retainer opening is in gaseous and liquid communication with the coalescing filter media.

13. The vent assembly of claim 3, wherein the first retainer opening is in gaseous communication with the coalescing filter media and the first retainer opening is not in liquid communication with the radial openings.

14. The vent assembly of claim 1, wherein the first retainer opening is in gaseous and liquid communication with the coalescing filter media.

15. The vent assembly of claim 1, wherein the coalescing filter media comprises a plurality of layers of sheets of coalescing filter media.

16. The vent assembly of claim 1, wherein the coalescing filter media comprises at least one sheet of coalescing filter media in a spiral configuration.

17. The vent assembly of claim 10, wherein a spacing region is defined between the membrane and the coalescing filter media.

18. The vent assembly of claim 1, wherein the vent assembly is configured to be inserted in a hub cap window.

19. A method of making a vent assembly comprising:
    molding a vent body having an endcap portion at a first end, an inner surface, and an insertion portion at a second end to form a cohesive, unitary component, wherein the inner surface defines a cavity and a central axis extending from the first end to the second end, and the endcap portion defines radial openings in fluid communication with the cavity;
    inserting a first retainer into the cavity of the vent body to form a frictional fit with the inner surface;
    inserting a membrane into the cavity of the vent body;
    inserting coalescing filter media into the cavity of the vent body after inserting the first retainer and membrane; and
    inserting a second retainer into the cavity of the vent body to form a frictional fit with the inner surface, wherein inserting the second retainer is after inserting the coalescing filter media.

20. The method of claim 19, wherein the cohesive, unitary vent body defines a retaining rim that extends radially outward from the insertion portion.

21. The method of claim 19, wherein the coalescing filter media comprises a plurality of layers of sheets of coalescing filter media.

22. The method of claim 19, further comprising inserting the insertion portion of the vent body into an opening defined by a hubcap window.

23. The method of claim 19, wherein inserting the membrane into the cavity comprises coupling the membrane to the inner surface of the vent and inserting the first retainer is after inserting the membrane.

24. The method of claim 19, wherein inserting the membrane into the cavity comprises coupling the membrane to the first retainer whereby inserting the membrane and inserting the first retainer is simultaneous.

25. A vent assembly comprising:
    a vent body having an inner surface defining a cavity, wherein the vent body defines a first end and a second end and the vent body defines a central axis extending from the first end to the second end, wherein the vent body has an endcap portion on the first end that extends over the cavity;
    a first retainer extending from the inner surface across the cavity, wherein the first retainer is positioned towards the first end of the vent body, wherein the first retainer defines a first retainer opening extending to a first radial distance from the central axis;
    a second retainer extending from the inner surface across the cavity, wherein the second retainer is positioned towards the second end of the vent body, wherein the second retainer defines a second retainer opening extending to a second radial distance from the central axis, wherein the second radial distance is greater than the first radial distance; and coalescing filter media disposed in the cavity between the first retainer and the second retainer; wherein the coalescing filter media, the cavity, the first retainer, and the second retainer cumulatively define an airflow pathway.

26. A vent assembly comprising:

a vent body having an inner surface defining a cavity, wherein the vent body defines a first end and a second end and the vent body defines a central axis extending from the first end to the second end;

a first retainer extending from the inner surface across the cavity, wherein the first retainer is positioned towards the first end of the vent body, wherein the first retainer defines a first retainer opening extending to a first radial distance from the central axis;

a second retainer extending from the inner surface across the cavity, wherein the second retainer is positioned towards the second end of the vent body, wherein the second retainer defines a second retainer opening extending to a second radial distance from the central axis, wherein the second radial distance is greater than the first radial distance;

coalescing filter media disposed in the cavity between the first retainer and the second retainer; wherein the coalescing filter media, the cavity, the first retainer, and the second retainer cumulatively define an airflow pathway; and a membrane, wherein the first retainer is disposed across the cavity between the coalescing filter media and the membrane.

\* \* \* \* \*

UNITED STATES PATENT AND TRADEMARK OFFICE
CERTIFICATE OF CORRECTION

PATENT NO. : 11,285,420 B2
APPLICATION NO. : 16/611760
DATED : March 29, 2022
INVENTOR(S) : Shannon Lees, Daniel Dotzler and Michael J. Hebert It is certified that error appears in the above-identified patent and that said Letters Patent is hereby corrected as shown below:

In the Claims

Claim 23, Line 45, 'vent and inserting' should read --vent body and inserting--.

Signed and Sealed this
Ninth Day of May, 2023

Katherine Kelly Vidal
*Director of the United States Patent and Trademark Office*